(12) United States Patent
Das et al.

(10) Patent No.: US 9,240,927 B2
(45) Date of Patent: Jan. 19, 2016

(54) METHODS AND APPARATUS FOR ENHANCED OVERLAY STATE MAINTENANCE

(75) Inventors: Saumitra Mohan Das, San Jose, CA (US); Vidya Narayanan, San Diego, CA (US); Lakshminath Reddy Dondeti, Hyderabad (IN); Ranjith S. Jayaram, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 997 days.

(21) Appl. No.: 12/712,983

(22) Filed: Feb. 25, 2010

(65) Prior Publication Data
US 2011/0004681 A1 Jan. 6, 2011

Related U.S. Application Data

(60) Provisional application No. 61/155,868, filed on Feb. 26, 2009, provisional application No. 61/185,535, filed on Jun. 9, 2009.

(51) Int. Cl.
*G06F 15/16* (2006.01)
*H04L 12/24* (2006.01)
*H04L 29/08* (2006.01)

(52) U.S. Cl.
CPC ............. *H04L 41/12* (2013.01); *H04L 67/104* (2013.01); *H04L 67/1044* (2013.01)

(58) Field of Classification Search
CPC .............................. H04L 45/02; H04L 45/028
USPC ................................................... 709/222, 224
See application file for complete search history.

(56) References Cited

U.S. PATENT DOCUMENTS 6,480,473 B1 * 11/2002 Chambers et al. ............. 370/253
6,490,244 B1 * 12/2002 Pegrum et al. ................. 370/216
(Continued)

FOREIGN PATENT DOCUMENTS

CN 101073220 A 11/2007
CN 101261635 A 9/2008
(Continued)

OTHER PUBLICATIONS

Massoulie, Laurent, et al. "Peer Counting and Sampling in Overlay Networks: Random Walk Methods," Jul. 22, 2006, PODC '06, ACM, pp. 123-132.*
(Continued)

*Primary Examiner* — Douglas Blair
(74) *Attorney, Agent, or Firm* — Paul Kuo

(57) ABSTRACT

Methods and apparatus for enhanced overlay state maintenance in a peer-to-peer overlay network. A first method includes inferring that a first node is leaving the overlay network, and transmitting a decrement message to decrement a size counter value. A second method includes identifying a set of nodes associated with a first node of an overlay network, obtaining a segment length associated with each node of the set of nodes, and determining a size of the overlay network by dividing the total number of nodes in the set of nodes by the sum of the segment lengths. A third method includes identifying a set of nodes associated with a first node of an overlay network, obtaining a size estimate associated with the first node and with each node of the set of nodes, and determining a size of the overlay network by averaging the size estimates.

23 Claims, 8 Drawing Sheets

(56) References Cited

U.S. PATENT DOCUMENTS

| | | | |
|---|---|---|---|
| 6,677,858 B1 | 1/2004 | Faris et al. | |
| 8,094,585 B2* | 1/2012 | Liang et al. | 370/256 |
| 8,549,175 B2* | 10/2013 | Krishna | 709/239 |
| 2004/0054807 A1* | 3/2004 | Harvey et al. | 709/243 |
| 2004/0081166 A1 | 4/2004 | Stanforth et al. | |
| 2004/0203435 A1 | 10/2004 | Karlquist et al. | |
| 2005/0060429 A1* | 3/2005 | Massoulie et al. | 709/243 |
| 2005/0223102 A1 | 10/2005 | Zhang et al. | |
| 2006/0251062 A1* | 11/2006 | Jain et al. | 370/389 |
| 2007/0204061 A1 | 8/2007 | Chen et al. | |
| 2007/0230482 A1 | 10/2007 | Shim et al. | |
| 2007/0237089 A1 | 10/2007 | Chen et al. | |
| 2008/0288654 A1* | 11/2008 | Matuszewski et al. | 709/238 |
| 2009/0063675 A1* | 3/2009 | Faris et al. | 709/224 |
| 2011/0055365 A1 | 3/2011 | Krishna | |
| 2012/0185899 A1* | 7/2012 | Riedl et al. | 725/35 |

FOREIGN PATENT DOCUMENTS

| | | |
|---|---|---|
| CN | 101378325 A | 3/2009 |
| JP | 2005323346 A | 11/2005 |
| TW | I269169 B | 12/2006 |
| WO | WO03098814 | 11/2003 |
| WO | 2006063275 A1 | 6/2006 |

OTHER PUBLICATIONS

16th Mobile and Wireless Communication Summit—"Field Division Routing", 2007, p. 629-634.
International Search Report and Written Opinion—PCT/US2010/038040, International Search Authority—European Patent Office—Sep. 29, 2010.
Kunzmann G., et al., "Analyzing and Modifying Chord's Stabilization Algorithm to Handle High Churn Rates" IEEE Explore 2005, pp. 885-890, XP002601159.
Maenpaa G Camarillo J Hautakorpi Ericsson J: "A Self-tuning Distributed Hash Table (DHT) for Resource Location and Discovery (RELOAD); draft-maenpaa-p2psip-self-tuning-00.txt" a Self-Tuning Distributed Hash Table (DHT) for Resource Location and Discovery (RELOAD); draft-maenpaa-p2psip-self-tuning-00.txt, Internet Engineering Task Force, IETF; Standard Working Draft, Internet Society (ISOC) 4, Rue Des Falaises CH-1205 Geneva, Feb. 16, 2009, XP015061541.
Maenpaa J, et al., "Study on maintenance operations in a chord-based Peer-to-Peer session initiation protocol overlay network" Parallel & Distributed Processing, 2009. IPDPS 2009. IEEE International Symposium on, IEEE, Piscataway, NJ, USA, May 23, 2009, pp. 1-9, XP031487394.
Rossi D, et al., "Gambling heuristic on a chord ring" Global Telecommunications Conference, 2005. Globecom '05. IEEE St. Louis, MO, USA, Nov. 28-Dec. 2, 2005, Piscataway, NJ, USA, IEEE LNKD DOI: 10.1109/GLOCOM.2005.1577763, vol. 2, Nov. 28, 2005, pp. 873-878, XP010879590.
USENIX Annual Technical Conference—"Structured and Unstructured Overlays Under the Microscope", 2006, p. 341-355.
Chen W, et al., "Dynamic Local Peer Group Organizations for Vehicle Communications," Mobile and Ubiquitous Systems—Workshops, 2006. 3rd Annual International Conference on, IEEE, PI, Jul. 1, 2006, pp. 1-8, XP031089403 ISBN: 978-0/7803-9791-0 p. 3, right-hand column, line 6-line 52.
European Search Report—EP12194847—Search Authority—Berlin—Jan. 29, 2013.
European Search Report—EP12194853—Search Authority—Berlin—Jan. 29, 2013.
Ganesh A, et al., "Peer Counting and Sampling in Overlay Networks Based on Random Walks," Distributed Computing, Springer, Berlin, DE LNKD-DOI: 10.1007/S00446-007-0027-Z, vol. 20, No. 4, Jun. 5, 2007, pp. 267-278, XP019564156 ISSN : 1432-0452 *abstract paragraph [001]-paragraph [02.2].
Ghinita G, et al., "An Adaptive Stabilization Framework for Distributed Hash Tables," Parallel and Distributed Processing Symposium, 2006. IPDPS 2006. 20th International Rhodes Island, Greece Apr. 25-29, 2006, Piscataway, NJ, USA,IEEE LNKDDO1 : 10.1109/IPDPS. 2006.1639269, Apr. 25, 2006, pp. 1-10, XP010920239 ISBN: 978-1-4244-0054-6 p. 3, left-hand column, line 3-line 17 p. 6, left-hand column, line 29-line 36.
International Search Report and Written Opinion—PCT/US2010/025665—ISA/EPO—Sep. 6, 2010.
Kunzmann, G., "Increasing the reliability of structured P2P networks", Design of Reliable Communication Networks, 2005 (DRCN 2005), Proceedings 5th International Workshop on, IEEE, Oct. 10-19, 2005.
Luo X., et al., "DHT-assisted probabilistic exhaustive search in unstructured P2P networks", Parallel and Distributed Processing, 2008 IPDPS 2008, IEEE International Symposium on IEEE, Apr. 14-18, 2008, pp. 1-9.
Merrer E.L., et al., "Peer to Peer Size Estimation in Large and Dynamic Networks: A Comparative Study," 2006 15th IEEE International Conference on High Performance Distrbuted Computing Paris, France Jun. 19-23, 2006, Piscataway, NJ, USA, IEEE, Jun. 19, 2006, pp. 7-17, XP010926036 ISBN: 978-1-4244-0307-3 * abstract p. 8, left-hand column, line 5-line 15 paragraph [_II.].
Stoica I, et al., "MIT-LCS-TR-819—Chord: A Scalable Peer-to-peer Lookup Service for Internet Applications" Internet Citation Mar. 23, 2001, XP002328538 Retrieved from the Internet: URL:http://www.1cs.mi t.edu/publi cati ons/pu bs/ps/MIT-LCS-TR-819.ps> [retrieved on May 17, 2005] paragraph [04.4]-paragraph [4.4.1].
Zhu Y., et al., "Ferry: An architecture for content-based publish/subscribe services on P2P networks", Parallel Processing, 2005, ICPP 2005, International Conference on IEEE, Jun. 17, 2005.
Taiwan Search Report—TW099105711—TIPO—May 30, 2013.

* cited by examiner

METHODS AND APPARATUS FOR ENHANCED OVERLAY STATE MAINTENANCE

CLAIM OF PRIORITY UNDER 35 U.S.C. §119

The present application for patent claims priority to Provisional Application No. 61/155,868 entitled "Methods and Apparatus for Size Estimation of Peer-to-Peer Overlay Networks" filed Feb. 26, 2009, and to Provisional Application No. 61/185,535 entitled "Methods and Apparatus for an Adaptive Self Tunable Approach for Overlay Routing Stabilization and Size Estimation," filed Jun. 9, 2009, both assigned to the assignee hereof and hereby expressly incorporated by reference herein.

RELATED APPLICATION

The present application for patent is related to application Ser. No. 12/712,305, entitled "Methods and Apparatus for Adaptively Scheduling a Finger Stabilization Algorithm," filed Feb. 25, 2010, and assigned to the assignee hereof.

BACKGROUND

1. Field

The present application relates generally to the operation of overlay networks, and more particularly, to methods and apparatus for enhanced overlay state maintenance in a peer-to-peer overlay network.

2. Background

A network in which member nodes obtain services in the absence of server-based infrastructure is referred to as a "peer-to-peer" overlay network. In a peer-to-peer overlay, peer nodes co-operate with each other to provide services and to maintain the network. Peer-to-peer overlay networks can be built on top of an underlying network, such as a network utilizing the Internet Protocol (IP).

In a peer-to-peer overlay network, each node has knowledge of one or more peers participating in the overlay. A simple but inefficient approach to routing data on the overlay network from a source node to a destination node is to continually pass the data to the next hop or successor node (i.e., node logically next to the source node in the identity space) until the destination node is reached. However this approach incurs excessive latency as the size of the overlay network and number of hops increases. Therefore, for routing optimization, each node maintains a list of fingers that are one node, two nodes, four nodes, or up to $2^{(m-1)}$ nodes away from itself; where m is the number of bits assigned to each node identifier. This helps in minimizing the number of hops needed to route data from node O(n) to node O(log(n)) where n is the number of nodes for the average case.

However, nodes may come and go at any time and result in changes in the overlay network configuration that affects the fingers known to a particular node. To compensate for this variability, each node re-runs a finger stabilization algorithm that re-computes the fingers known to that node. The results of the finger stabilization algorithm are stored in a finger table. Unfortunately, since each node maintains it own finger table, determining the frequency at which each node needs to run its finger stabilization algorithm may be problematic. For example, if a node does not run its finger stabilization algorithm often enough, its finger table may become stale resulting in inefficient and delayed packet routing. If a node runs its finger stabilization algorithm too often, this may result in wasting overlay bandwidth and/or placing a burden on other nodes on the overlay network. For example, running the stabilization algorithm requires power, and excessive execution of the stabilization algorithm may waste power at battery operated nodes.

Furthermore, since structured peer-to-peer overlay networks are highly distributed in nature, participating nodes do not have complete routing tables and hence do not know the size of the overlay network they are operating in. However, knowledge of the size of the overlay network can be useful for several purposes, such as when merging overlays, performing load balancing or caching strategies, as well as routing protocol specialization.

Unfortunately, conventional systems may fail to provide an accurate overlay network size. For example, nodes may leave the overlay without gracefully notifying their neighbors, and as a result, the size of the overlay network may not be accurately maintained.

Therefore, it would be desirable to have a simple cost effective mechanism that operates to allow a node to adaptively schedule a finger stabilization algorithm and to determine the size of an overlay network to overcome the problems described above.

SUMMARY

In one or more aspects, an adaptive scheduling (AS) system, comprising methods and apparatus, is provided that operates adaptively to allow a node to determine a time interval between executions of a finger stabilization algorithm and thereby adaptively schedule execution of the algorithm. The system also operates to allow nodes to determine the size of the overlay network on which they are participating thereby facilitating network functions such as merging, load balancing and caching.

In an aspect, a method is provided for determining a size of a peer-to-peer overlay network. The method comprises inferring that a first node is leaving the overlay network, and transmitting a decrement message to decrement a size counter value.

In an aspect, an apparatus is provided for determining a size of a peer-to-peer overlay network. The apparatus comprises a processor configured to infer that a first node is leaving the overlay network, and a transmitter coupled to the processor and configured to transmit a decrement message to decrement a size counter value.

In an aspect, a method is provided for determining a size of a peer-to-peer overlay network. The method comprises identifying a set of nodes associated with a first node of an overlay network, obtaining a segment length associate with each node of the set of nodes, and determining a size of the overlay network by dividing a total number of the nodes in the set of nodes by a sum of the segment lengths.

In an aspect, an apparatus is provided for determining a size of a peer-to-peer overlay network. The apparatus comprises a processor configured to identify a set of nodes associated with a first node of an overlay network, a transceiver coupled to the processor and configured to obtain a segment length associate with each node of the set of nodes, and where the processor configured to determine a size of the overlay network by dividing the total number of the nodes in the set of nodes by a sum of the segment lengths.

In an aspect, a method is provided for determining a size of a peer-to-peer overlay network. The method comprises identifying a set of nodes associated with a first node of an overlay network, obtaining a size estimate associated with the first node and with each node of the set of nodes, and determining a size of the overlay network by averaging the size estimates.

In an aspect, an apparatus is provided for determining a size of a peer-to-peer overlay network. The apparatus comprises a processor configured to identify a set of nodes associated with a first node of an overlay network, and to obtain a size estimate associated with the first node, a transceiver coupled to the processor and configured to obtain a size estimate associated with each node of the set of nodes, and where the processor is configured to determine a size of the overlay network by averaging the size estimates.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects and implementations of an AS system for adaptively scheduling execution of a finger stabilization algorithm and for determining a size of an overlay network.

Figure 1:
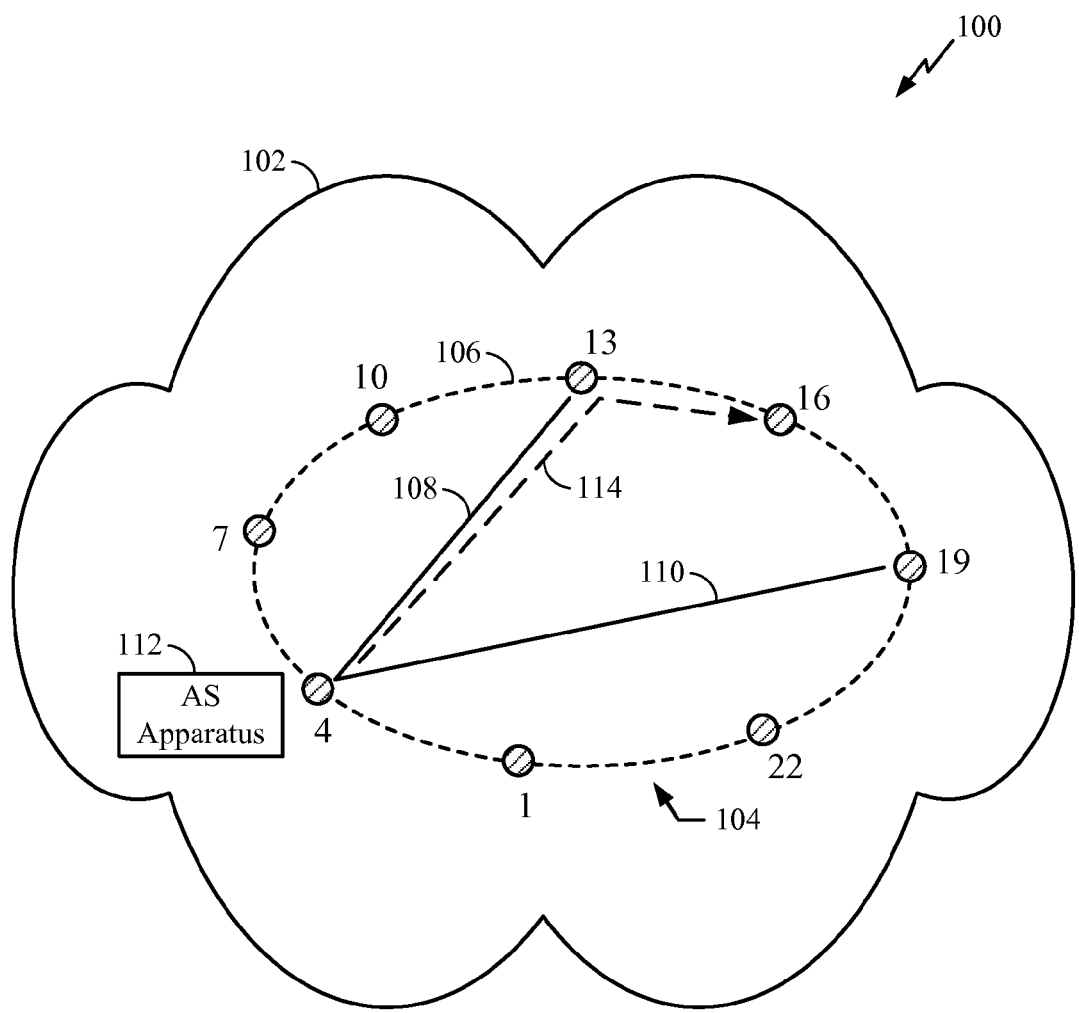
FIG. 1 shows a network that illustrates the operation of the AS system.

FIG. 1 shows a network 100 that illustrates the operation of an AS system. The network 100 includes an underlying network 102 which comprises any type of network, such as an Internet Protocol network. Although the underlying network 102 is shown as a single entity, the underlying network may comprise any number or types of networks such as WANs, LANs, wireless networks and/or any other type of network.

A peer-to-peer overlay network 104 comprises a subset of the nodes of the underlying network 102 and operates utilizing the services of the underlying network 102 to allow those nodes to communicate. In the peer-to-peer overlay network 104, the nodes are connected by communication links 106 to form a circular routing path. The communication links 106 may be secure tunnels provided by the underlying network 102. The peer-to-peer overlay network 104 operates with a set of permissions and interactions that are distinct from underlying network 102. It should also be noted that the peer-to-peer overlay network 104 may have any topology or architecture to enable any routing pattern and it is not limited to the routing shown in FIG. 1.

Each of the nodes in the peer-to-peer overlay network 104 establishes a node identifier. For simplicity and ease of description, the node identifiers for the nodes of the peer-to-peer overlay network 104 are (1, 4, 7, 10, 13, 16, 19, and 22). It should be noted that in practice, the overlay network may comprise a very large number of nodes and utilize larger node identifiers. During operation, traffic can flow around the peer-to-peer overlay network 104 in either direction.

To facilitate traffic routing, each node of the overlay network 104 computes and maintains a finger table that identifies routing fingers that cut across the overlay network 104. For example, each node runs a finger stabilization algorithm to identify the routing fingers based on the overlay network's current configuration. Thus, as nodes join and leave the overlay network, the finger stabilization algorithm will identify the routing fingers associated with each node. For example, the finger stabilization algorithm running at node 4 has identified finger 108 to node 13 and finger 110 to node 19. The use of the fingers provides more efficient packet routing across the overlay network 104. For example, a packet at node 4 to be routed to node 16 can be routed along finger 108 in a first hop, and then routed to node 16 in a second hop as illustrated by routing path 114.

An AS apparatus is provided at each of the nodes of the overlay network 104. For simplicity, the AS apparatus 112 is shown at node 4 of the overlay network 104; however, a similar AS apparatus may be located at each node of the overlay network 104. The AS apparatus 112 operates to adaptively schedule executions of a finger stabilization algorithm performed at node 4. The AS apparatus 112 is suitable for use with any type of finger stabilization algorithm and the following provides a brief description of its operation.

The AS apparatus 112 starts with an initial or base time interval (i.e., t seconds) between executions of the finger stabilization algorithm. When the stabilization algorithm is run, node 4 may discover N fingers. The AS apparatus 112 measures a time interval for t seconds and triggers node 4 to execute the finger stabilization algorithm again. If the differences between two finger results (i.e., number and/or types of fingers determined) meets a first criteria, then the AS apparatus 112 operates to increase the time interval between executions of the finger stabilization algorithm. For example, in one implementation, the time interval is increase by a factor of 2. However, if the differences meet second criteria, then the AS apparatus 112 operates to decrease the time interval between executions of the finger stabilization algorithm. For example, in one implementation the time interval is decreased by a factor of 2. The first and second criteria can be defined to meet any suitable performance goals. For example, the first criteria may be met if there are no differences between the two finger results. The second criteria may be met if there are any differences found between the two finger results. Thus, it is also possible to define the first and second criteria to test any set of conditions with respect to changes in the finger table of a particular node.

Therefore, through this adaptive self-tunable approach, the AS apparatus 112 allows each node to arrive independently and adaptively at a steady state interval between executions of the finger stabilization algorithm. Furthermore, the system allows each node to approximate independently the size of the overlay. For example, if a particular node has identified N fingers in the overlay network at time t, then there are at most $2^N$ nodes in the overlay network at that time. Thus, if a particular node has identified three unique fingers, then that node approximates the size of the overlay network to be 8 ($2^3$) nodes. However, this approximation will vary with time and serves to provide a node with an approximate size range of the overlay network.

The AS system requires no coordination among nodes or global knowledge of the system to schedule the finger stabilization algorithm, which is valuable for peer-to-peer distributed applications. A more detailed description of the operation of the AS apparatus 112 is provided below.

Figure 2:
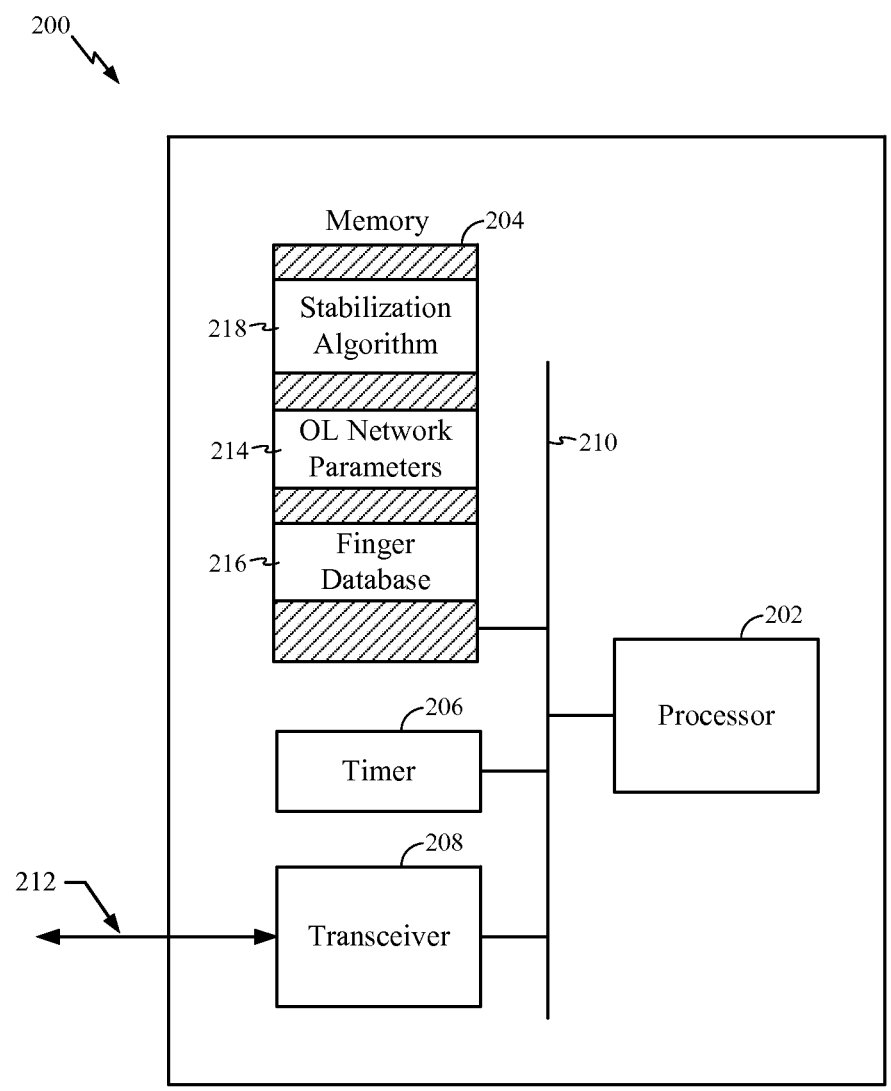
FIG. 2 shows an exemplary AS apparatus constructed in accordance with the AS system.

FIG. 2 shows an exemplary AS apparatus 200 constructed in accordance with the AS system. For example, the AS apparatus 200 is suitable for use as the AS apparatus 112 shown in FIG. 1. The AS apparatus 200 comprises processor 202, memory 204, timer 206, and transceiver 208 all coupled to communicate using data bus 210. It should be noted that the AS apparatus 200 is just one implementation and that other implementations are possible.

The transceiver 208 comprises hardware and/or hardware executing software that operate to allow the AS apparatus 200 to communicate data or other information with a plurality of nodes on a peer-to-peer overlay network. The transceiver 210 is operable to establish one or more communication links 212 with nodes of the peer-to-peer overlay network for the purpose of performing a finger stabilization algorithm or network size estimation. For example, the communication links 212 may be secure tunnels that are formed utilizing the services of an underlying IP network.

The memory 204 comprises any suitable storage device operable to allow the storage and retrieval of information during operation of the AS system. The memory 204 operates to store overlay network parameters 114 that comprise information about an overlay network including node identifiers, underlying network identifiers, service identifiers and any other parameters or information related to the operation or use of an overlay network. The overlay network parameters 114 also comprise first and second sets of criteria that are used during operation of the AS system. For example, the sets of criteria are stored in the memory 204 by the processor 202. The processor 202 is also operable to update, change, or other modify the sets of criteria. The sets of criteria are used during operation of the AS system to determine when to increase or decrease a time interval between executions of a finger stabilization algorithm 218.

The memory 204 also operates to store finger database 216 comprising finger information associated with one or more nodes of a peer-to-peer overlay network. The finger database 216 is used to store information about the number and types of fingers available to a node. For example, the finger database 216 comprises information such as the number of fingers, types of fingers, finger end nodes, and any other information related to fingers of an overlay network. The information in the finger database 216 is determined from the execution of a finger stabilization algorithm 218 by the processor 202.

The timer 206 comprises hardware and/or hardware executing software that operates to measure a time interval based on time parameters received from the processor 202. For example, the time parameters include a count down value that is used to initialize a counter. The count down value corresponds to a particular time interval to be measured by the timer 206. Thus, the processor 202 may set the timer 206 to measure any desirable time interval. When the time interval has been measured, the timer 206 indicates timer expiration to the processor 202. For example, the timer 206 measures a particular time interval, at the end of which, the processor 202 is notified and thereafter operates to execute the finger stabilization algorithm 218. The finger stabilization algorithm 218 operates to determine information about fingers associated with a particular node.

The processor 202 comprises at least one of a CPU, processor, gate array, hardware logic, memory elements, and/or hardware executing software. The processor 202 operates to determine fingers available to a particular node in an overlay network. For example, the processor 202 executes the finger stabilization algorithm 218 and stores information about the determined fingers in the finger database 216. The processor 202 also operates to compare finger determinations determined by the finger stabilization algorithm to determine whether to increase or decrease a time interval before the finger stabilization algorithm is performed. The processor 202 controls the timer 206 to measure this time interval. The processor 202 also operates to perform one or more methods for overlay size estimation.

Adaptive Time Interval Determination

During operation of the AS system, the timer 206 operates to measure time intervals, after which, the processor 202 executes the finger stabilization algorithm 218. For example, the timer 206 signals the processor 202 that a time interval has ended or expired. The processor 202 operates to utilize the overlay network parameters 214 to determine information used to execute the finger stabilization algorithm 218. The resulting finger determination is stored in the finger database 216.

The processor 202 then determines the time interval to be measured before the next execution of the finger stabilization algorithm. The processor 202 determines the next time interval by comparing two finger results of the finger stabilization algorithm. For example, the processor 202 may compare the two most recent finger determinations, or may compare averaged finger results, or may select any particular finger results to compare. If the difference between the two finger results meet a first set of criteria (i.e., same number, types, end nodes, etc.) then the processor 202 increases the time parameters to correspondingly increase the time interval (TI). For example, in one implementation the time interval is increased as follows up to a selected maximum $TI_{max}$, which guarantees that the algorithm is performed at a minimum frequency of $1/TI_{max}$.

$$TI_{new} = TI_{old} * 2$$

If the difference between the two finger results meet a second set of criteria, then the processor 202 decreases the time parameters to correspondingly decrease the time interval (TI). For example, in one implementation the time interval is decreased as follows down to a selected minimum $TI_{min}$, which guarantees that the algorithm is performed at a maximum frequency of $1/TI_{min}$.

$$TI_{new} = TI_{old} / 2$$

Once the new time parameters are determined, the processor 202 provides the time parameters to the timer 206 to allow the new time interval to be measured. At the end of the time interval, the processor 202 executes the finger stabilization algorithm again. It should be noted that the techniques for increasing and decreasing the time interval provided above are just one implementation and that other techniques may be used. For example, the time interval may be increased and/or decreased at a faster or slower rate than described above. Virtually any technique for increase and/or decreasing the time interval may be used.

It should also be noted that the processor 202 may generate any set of parameters to define the first and second set of criteria to obtain selected performance of the AS system. For example, the first set of criteria may be defined such that these criteria are met if there are no differences or only small differences between the two finger determinations. Furthermore, the second set of criteria may be defined such that these criteria are met if there are any differences or only a large number of differences between the two finger determinations. Thus, the sets of criteria can be set by the processor 202 to detect virtually any finger dynamic (i.e., no change, small change, large change, particular change, etc.) and adjust the time interval between executions of the finger stabilization algorithm based on the detected finger dynamics.

In one implementation, the AS system comprises a computer program product having one or more program instructions ("instructions") or sets of "codes" stored or embodied on a computer-readable medium. When the codes are executed by at least one processor, for instance, processor 202, their execution causes the AS apparatus 200 to provide the functions of the AS system described herein. For example, the computer-readable medium comprises a floppy disk, CDROM, memory card, FLASH memory device, RAM, ROM, or any other type of memory device or computer-readable medium that interfaces to the AS apparatus 200. In another aspect, the sets of codes may be downloaded into the AS apparatus 200 from an external device or communication network resource. The sets of codes, when executed, operate to provide aspects of an AS system as described herein.

Figure 3:
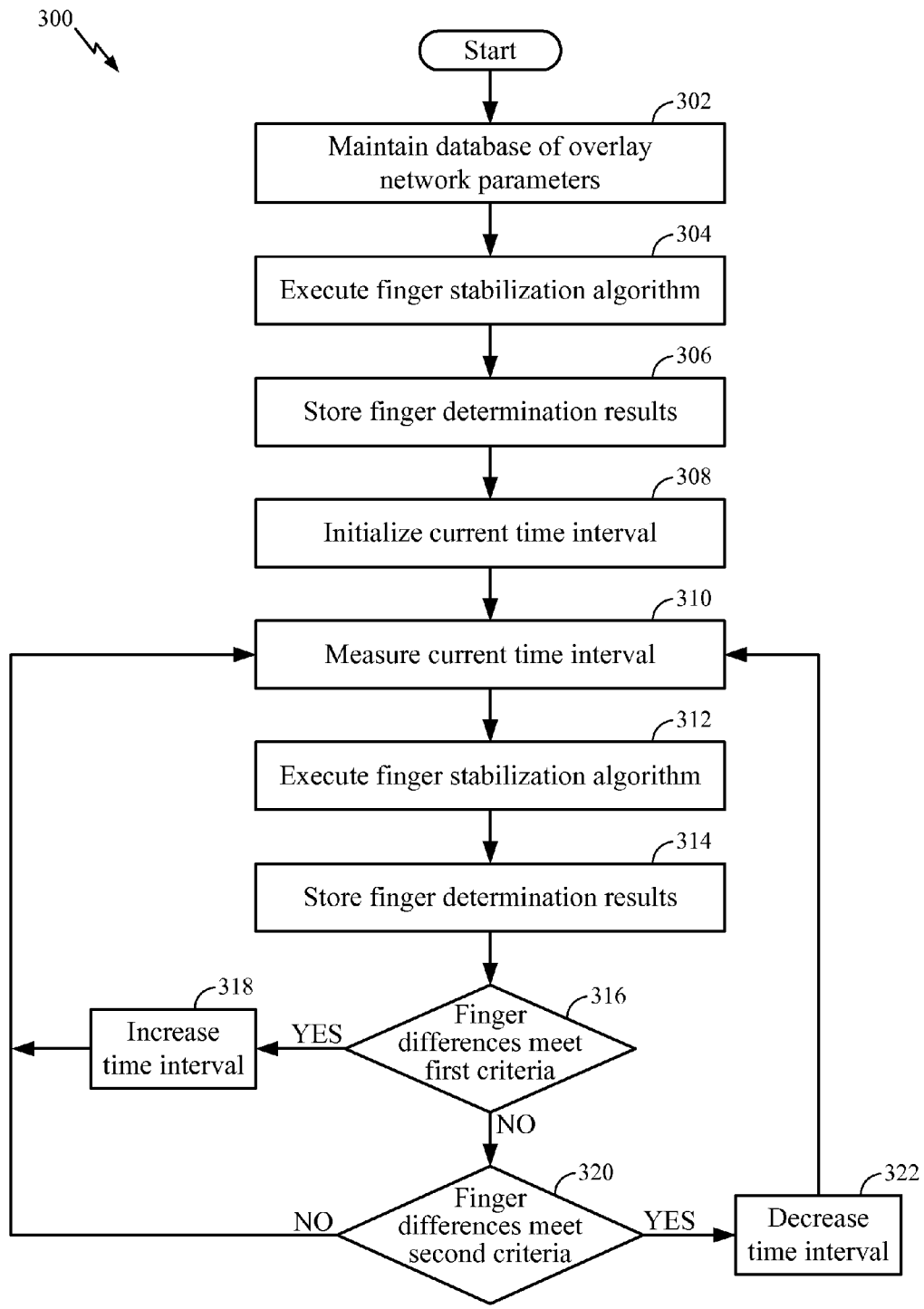
FIG. 3 shows an exemplary method for adaptively scheduling a finger stabilization algorithm in accordance with the AS system.

FIG. 3 shows an exemplary method 300 for adaptively scheduling a finger stabilization algorithm in accordance with the AS system. For clarity, the method 300 is described below with reference to the AS apparatus 200 shown in FIG. 2. In one implementation, the processor 202 executes one or more sets of codes to control the AS apparatus 200 to perform the functions described below.

At block 302, a database of overlay network parameters is maintained. In one implementation, the processor 202 maintains the parameters database 214 in the memory 204. For example, the parameters database 214 comprises, but is not limited to, IP addresses, node identifiers, and/or any other parameters related to one or more nodes operating on a peer-to-peer overlay network.

At block 304, a finger stabilization algorithm is performed. In one implementation, the processor 202 executes the stabilization algorithm 218 to communicate with other nodes of an overlay network using the transceiver 208 and the communication links 212 to determine fingers of the overlay network. The processor 202 performs any suitable stabilization algorithm to determine the fingers associated with the overlay network.

At block 306, the results of the finger stabilization algorithm are stored in memory. For example, the processor 202 stores the results of the finger stabilization algorithm in the memory 204 as part of the finger database 216.

At block 308, a time interval is initialized. For example, the processor 202 inputs initial time parameters into the timer 206 so that the timer 206 can measure an initial time interval.

At block 310, the method waits for the current time interval to be measured. For example, the timer 206 measures the current time interval and provides an indication to the processor 202 when the time interval has expired.

At block 312, a finger stabilization algorithm is performed. In one implementation, in response to the timer 206 expiration, the processor 202 executes the stabilization algorithm 218 to communicate with other nodes of an overlay network using the transceiver 208 and the communication links 212 to determine fingers of the overlay network. The processor 202 performs any suitable stabilization algorithm to determine the fingers associated with the overlay network.

At block 314, the results of the finger stabilization algorithm are stored in memory. For example, the processor 202 stores the results of the finger stabilization algorithm in the memory 204 as part of the finger database 216.

At block 316, a determination is made as to whether the differences between two finger determinations met a first set of criteria. For example, the processor 202 retrieves the recent and previous finger results from the finger database 216 and compares them to determine if the differences between them met the first set of criteria. For example, the first set of criteria may be met if there are no differences or only small differences between the first and second finger determinations. If the first set of criteria is met, the method proceeds to block 318. If the first set of criteria is not met, the method proceeds to block 320.

At block 318, the current time interval is increased. For example, the processor 202 increases the time interval by a factor of 2 and inputs the new time parameters into the timer 206 so that the timer 206 can measure the updated time interval. The method then proceeds to block 310 to wait for expiration of the timer 206. It should be noted that the processor 202 can utilize any suitable technique or algorithm to increase the time interval.

At block 320, a determination is made as to whether the differences between two finger determinations met a second set of criteria. For example, the processor 202 retrieves the recent and previous finger results from the finger database 216 and compares them to determine if the differences between them met the second set of criteria. For example, the second set of criteria may be met if there are any differences or only large differences between the first and second finger determinations. If the second set of criteria is met, the method proceeds to block 322. If the second set of criteria is not met, the method proceeds to block 310 and does not change the time interval.

At block 322, the time interval is decreased. For example, the processor 202 decreases the time interval by a factor of 2 and inputs the new time parameters into the timer 206 so that the timer 206 can measure the updated time interval. The method then proceeds to block 310 to wait for expiration of the timer 206. It should be noted that the processor 202 can utilize any suitable technique or algorithm to decrease the current time interval. In one implementation, the time interval is decreased at a faster rate than it is increased.

Therefore, the method 300 is operable at a node to determine when fingers associated with an overlay network have changed and adaptively adjust a time interval between executions of a finger stabilization algorithm in accordance with the AS system. It should be noted that the method 300 is just one implementation and that the operations of the method 300 may be rearranged or otherwise modified within the scope of the various implementations. Thus, other implementations are possible.

Figure 4:
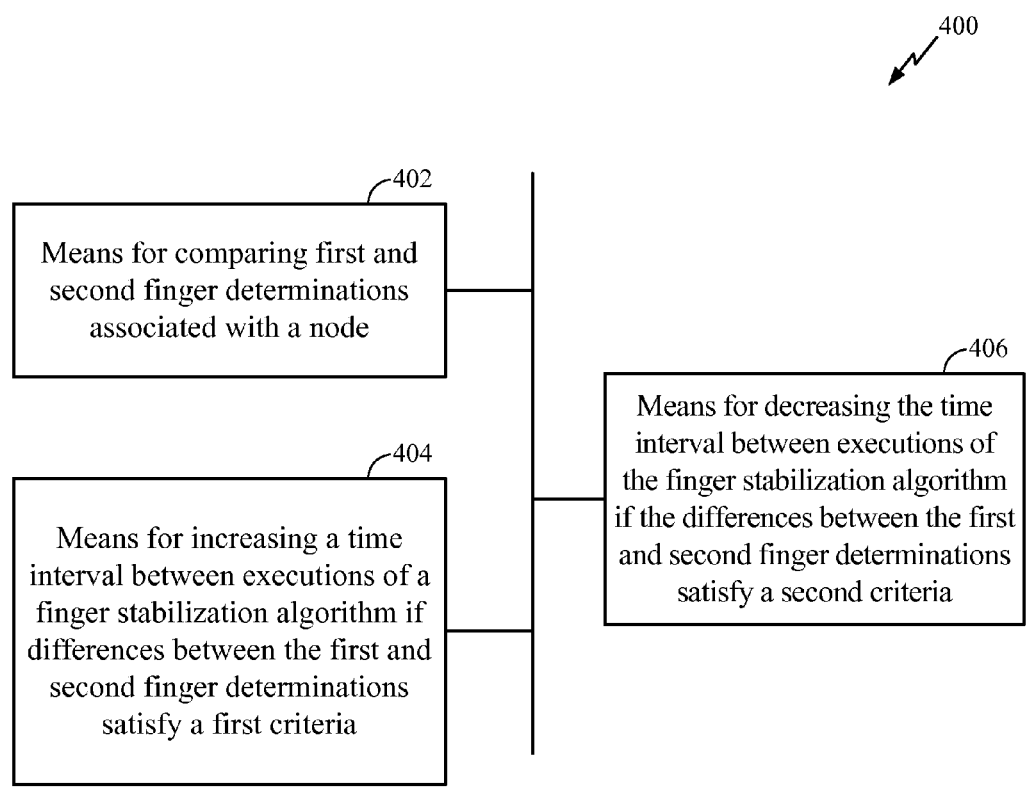
FIG. 4 shows an exemplary AS apparatus constructed in accordance with the AS system.

FIG. 4 shows an exemplary AS apparatus 400 constructed in accordance with the AS system. For example, the AS apparatus 400 is suitable for use as the AS apparatus 200 shown in FIG. 2. In an aspect, the AS apparatus 400 is implemented by at least one integrated circuit comprising one or more modules configured to provide aspects of an AS system as described herein. For example, in one implementation, each module comprises hardware and/or hardware executing software.

The AS apparatus 400 comprises a first module comprising means (402) for comparing first and second finger determinations associated with a node, which in an aspect comprises the processor 202. The AS apparatus 400 also comprises a second module comprising means (404) for increasing a time interval between executions of a finger stabilization algorithm if differences between the first and second finger determinations satisfy a first criteria, which in an aspect comprises the timer 206. The AS apparatus 400 also comprises a third module comprising means (406) for decreasing the time interval between executions of the finger stabilization algorithm if the differences between the first and second finger determinations satisfy a second criteria, which in an aspect comprises the timer 206.

Overlay Size Determination

The AS system also operates to determine overlay network size estimates. In one implementation, the AS apparatus 200 operates to perform two methods for size estimation of a peer-to-peer overlay network. In a first method, a centralized counter is utilized and combined with an inference of node dynamics to estimate the size of the overlay network. In a second method, a distributed estimation process is performed that uses piggybacked communication among peers as well as one or more heuristics to estimate the size of the overlay network.

Size Determination—Method One

Figure 5:
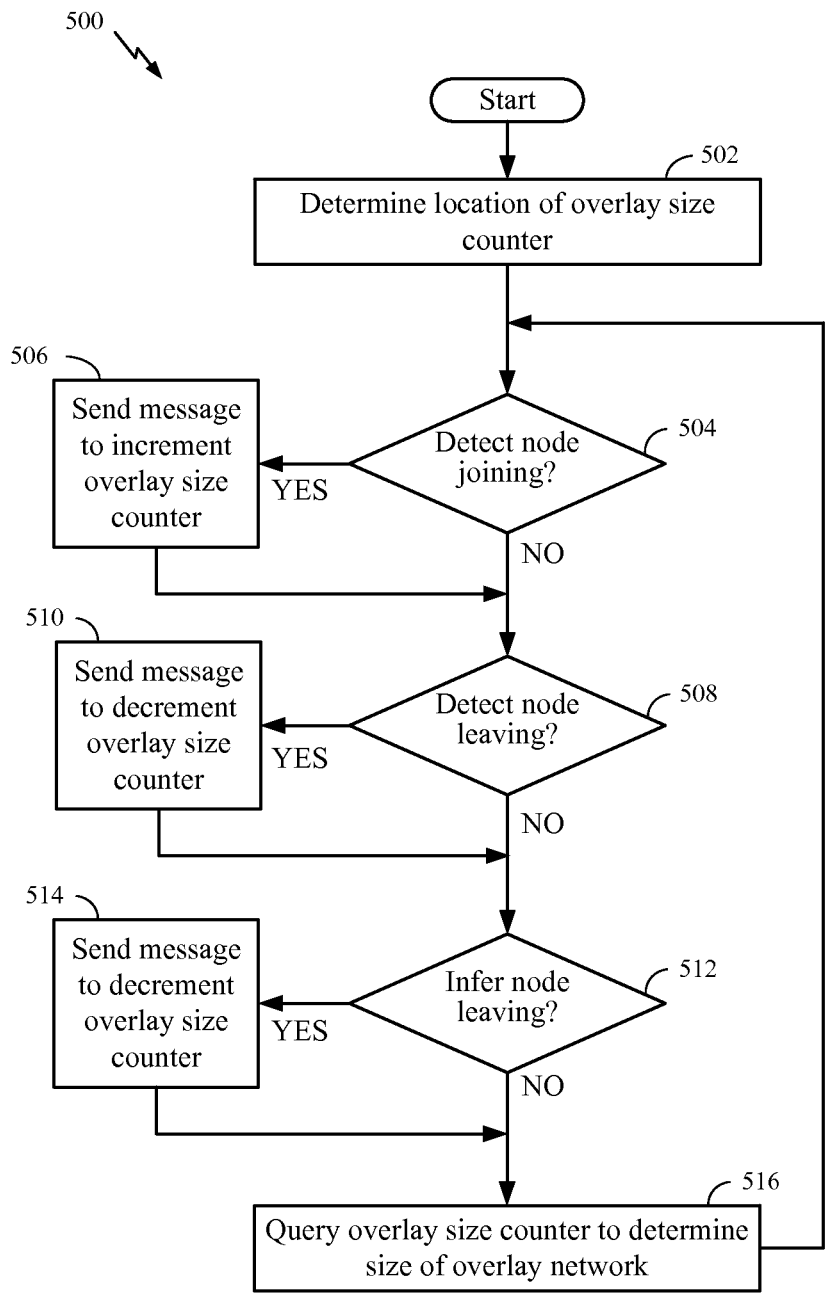
FIG. 5 shows a first method for determining overlay network size in accordance with the AS system.

FIG. 5 shows a first method 500 for determining overlay network size in accordance with the AS system. The first method 500 of size determination is based on a distributed hash table implementation of the overlay network where any data item has an associated data key. The data key is obtained by hashing a data key string using a collision-resistant hash function to a numeric key. Nodes also receive a node identity in the same keyspace. A data item is stored at the node whose node key is closest in numeric distance to the data item's key (numeric key).

For clarity, the method 500 is described below with reference to the AS apparatus 200 shown in FIG. 2. In one implementation, the processor 202 executes one or more sets of codes to control the AS apparatus 200 to perform the functions described below.

At block 502, an overlay size counter is maintained and indicates the current size of the overlay network. The overlay size counter can be accessed by any node participating in the overlay network. A description of the overlay size counter and how the overlay size counter is maintained and updated is provided below.

At block 504, a determination is made as to whether a joining node is detected. In one implementation, any node joining the overlay network adds a closest neighbor who is a successor in the numeric keyspace, i.e., whose node key is closest in the clockwise direction to the joining node's key. For example, it will be assumed that node 4 comprising the AS apparatus 112 shown in FIG. 1 is closest in the clockwise direction to a joining node. Thus, node 4 is designated as a "JOIN ANNOUNCER" for the joining node.

The join announcer is responsible for announcing node arrivals and incrementing the overlay size counter. It should be noted that the JOIN ANNOUNCER may be different for different joining nodes. In one implementation, the processor 202 makes the determination as to whether a joining node is detected by receiving communications from the joining node indicating it wishes to join the overlay network. If a joining node is detected, the method proceeds to block 506. If a joining node is not detected, the method proceeds to block 508.

At block 506, a message is sent to increment the overlay size counter. The overlay size counter is maintained in the distributed hash table. The overlay size counter is incremented when a JOIN ANNOUNCER sends a message to be stored at a data key obtained by hashing a well known string, such as "OVERLAY-SIZE" to represent a unique previously agreed upon counter variable. JOIN ANNOUNCERS send messages to the key of this overlay size counter defining an increment. Based on these messages, the overlay size counter is incremented on the node storing the counter, i.e. the node whose node key is closest to the counter key e.g. the hash of the string "OVERLAY-SIZE". In one implementation, the processor 202 controls the transceiver 208 to transmit the message to increment the overlay size counter.

At block 508, a determination is made as to whether a leaving node is detected. In one implementation, any node leaving the overlay gracefully sends a LEAVE message to its neighbors in the numeric keyspace. A node whose node key is closest in the counter-clockwise direction to the leave node's key is designated as the "LEAVE ANNOUNCER" for the leaving node. For example, it will be assumed that node 4 comprising the AS apparatus 112 shown in FIG. 1 is closest in the counter-clockwise direction to a leaving node. Thus, node 4 is designated as the LEAVE ANNOUNCER and is responsible for decrementing the overlay size counter. In one implementation, the processor 202 makes the determination as to whether a leaving node is detected by receiving communications from the leaving node indicating it wishes to leave the overlay network. If a leaving node is detected, the method proceeds to block 510. If a leaving node is not detected, the method proceeds to block 512.

At block 510, a message is sent to decrement the overlay size counter. The overlay size counter is maintained in the distributed hash table. The overlay size counter is decremented when a LEAVE ANNOUNCER sends a message to be stored at a data key obtained by hashing a well known string, such as "OVERLAY-SIZE" to represent a unique previously agreed upon counter variable. LEAVE ANNOUNCERS send messages to the key of this overlay size counter defining a decrement. Based on these messages, the overlay size counter is decremented on the node storing the counter, i.e. the node whose node key is closest to the counter key e.g. the hash of the string "OVERLAY-SIZE". In one implementation, the processor 202 controls the transceiver 208 to transmit the message to decrement the overlay size counter.

At block 512, a determination is made as to whether a leaving node can be inferred. Since nodes always join the overlay network gracefully but may not leave the overlay network gracefully, LEAVE ANNOUNCERs operate to determine by inference when a node leaves the overlay. In one implementation, the LEAVE ANNOUNCER updates the overlay size counter when it infers that a node has left the overlay. For example, the LEAVE ANNOUNCER for any particular node needs to maintain the connection to that particular node to maintain the routing integrity of the ring. The LEAVE ANNOUNCER can infer the leave of that particular node due to a connection failure or other indication, and subsequently update the overlay size counter. For example, it will be assumed that node 4 comprising the AS apparatus 112 shown in FIG. 1 maintains a connection to a particular node to maintain the routing integrity of the ring. In one implementation, the transceiver 208 detects a connection failure associated with the particular node. Thus, node 4 is designated as the LEAVE ANNOUNCER, and the processor 202 infers that the particular node has left the overlay and operates to update the overlay size counter even though a non-graceful leave has occurred.

In one implementation, the processor 202 makes the determination as to whether to infer that a node has left the overlay by detecting a connection failure or by receiving third party communications indicating that the node has left the overlay network. A third party communication may originate from another node in the overlay network. If a leaving node is inferred, the method proceeds to block 514. If a leaving node is not inferred, the method proceeds to block 516.

At block 514, a message is sent to decrement the overlay size counter. The overlay size counter is maintained in the distributed hash table. The overlay size counter is decremented when a LEAVE ANNOUNCER sends a message to be stored at a data key obtained by hashing a well known string, such as "OVERLAY-SIZE" to represent a unique previously agreed upon counter variable. LEAVE ANNOUNCERS send messages to the key of this overlay size counter defining a decrement. Based on these messages, the overlay size counter is decremented on the node storing the counter, i.e. the node whose node key is closest to the counter key e.g. the hash of the string "OVERLAY-SIZE". In one implementation, the processor 202 controls the transceiver 208 to transmit the message to decrement the overlay size counter.

At block 516, an overly network size counter is queried to determine a current network size. Nodes can learn about the network size by querying the same counter key by hashing the well known string such as "OVERLAY-SIZE" to retrieve the current value of the overlay size counter, which is the current estimate of the overlay network size.

It should be noted that the above operations can be performed at any node comprising the AS apparatus 200. Thus, the operations are performed in a distributed manner in that the overlay size counter may be incremented or decremented by any node acting as a JOIN ANNOUNCER or a LEAVE ANNOUNCER. Therefore, implementations of the AS system operate to infer a node leave so that an overlay size counter can be accurately updated in the case of ungraceful leaves. It should also be noted that the method 500 is just one implementation and that the operations of the method 500 may be rearranged or otherwise modified within the scope of the various implementations. Thus, other implementations are possible.

Size Determination—Method Two

A second method of size determination does not require any specific messages to be sent out denoting joins and leaves as in the method 500 above, nor is a well known agreed upon counter to be maintained in the distributed hash table. The second method utilizes an estimation technique that comprises two refinements that can be applied for additional precision.

Figure 6:
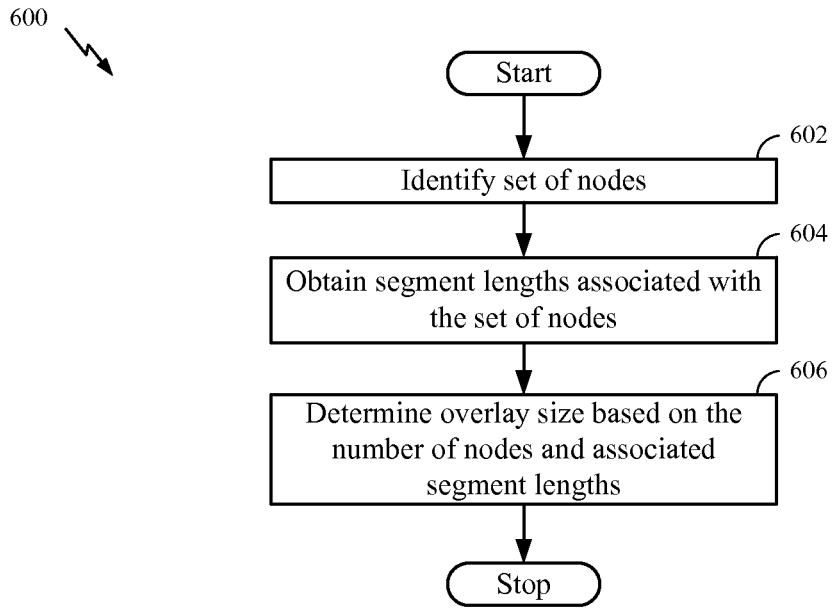
FIG. 6 shows a second method for determining overlay network size in accordance with the AS system.

FIG. 6 shows a second method 600 for determining overlay network size in accordance with the AS system. In the method 600, S denotes the sum of segment lengths (length of numeric ID space) managed by any set of k nodes. Then an estimate E of the overlay size, i.e. the number of nodes in the overlay, can be determined from k/S.

For clarity, the method 600 is described below with reference to the AS apparatus 200 shown in FIG. 2. In one implementation, the processor 202 executes one or more sets of codes to control the AS apparatus 200 to perform the functions described below. It will be assumed that the AS apparatus 200 is located at a node in an overlay network and that the AS apparatus 200 performs the functions below to determine the size of the overlay network.

At block 602, a set of nodes is identified in an overlay network. The set may include some or all of the nodes in the overlay network. For example, the nodes may comprise fingers, neighbors or nodes that are in communication with the node that comprises the AS apparatus. In one implementation, the processor 202 operates to identify the nodes that are part of the set.

At block 604, segment lengths associated with the set of nodes are obtained. In one implementation, the set of nodes are queried to obtain their associated segment lengths. The segment length is the part of the ID space between a given node and its clockwise successor. As the segment length decreases, there are a larger number of nodes in the network.

Since it may not be practical to sample all nodes in the overlay network to retrieve their associated segment lengths, in one implementation, the node comprising the AS apparatus asks the nodes it already maintains routing relationships with for their segment lengths. For example, the AS apparatus could query each of the nodes in the set for the segment lengths they manage. In another implementation, segment length information is piggybacked on top of normal messages between the node comprising the AS apparatus and its respective fingers or neighbors. Thus, the processor 202 controls the transceiver 208 to obtain some or all of the segment information from the set of nodes by piggybacking the information on top of normal communications.

At block 606, a size of the overlay network is determined based on the number of nodes in the set divided by the sum of their segment lengths. For example, assuming that the length of the ID space is partitioned to be between 0 and 1. If there is only one node in the overlay network, then E=1/1=1, which is the correct estimate in this case. Consider two nodes and that they partition the ID space such that the first node owns 0.3 and the second node owns 0.7. Then E=2/(0.3+0.7)=2. In one implementation, the processor 202 operates to determine the estimated size of the overlay network by dividing the total number of nodes in the set by the sum of their associated segment lengths.

Therefore, the method 600 operates to determine the size of an overlay network based on an identified set of nodes and their associated segment lengths. It should be noted that the method 600 is just one implementation and that the operations of the method 600 may be rearranged or otherwise modified within the scope of the various implementations. Thus, other implementations are possible.

Refinements to Method Two

Figure 7:
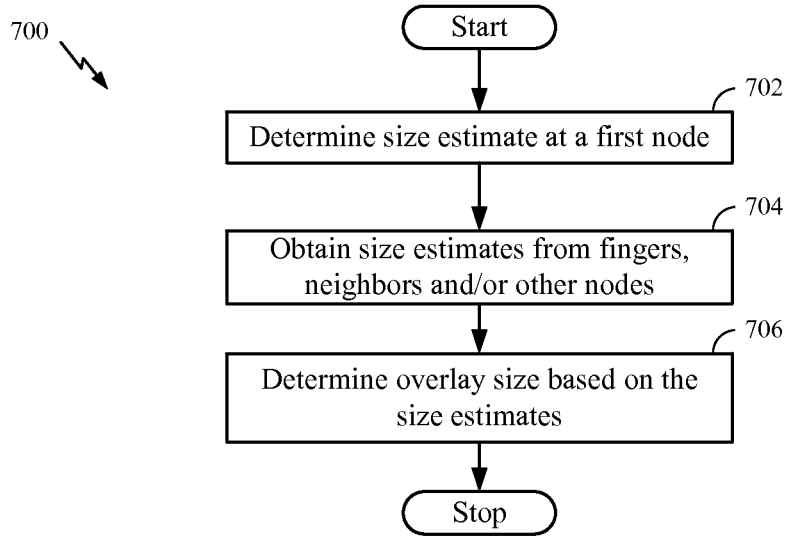
FIG. 7 shows a first refinement method for determining overlay network size in accordance with the AS system.

FIG. 7 shows a first refinement method 700 for determining overlay network size in accordance with the AS system. For example, in the method 700 operates to determine a more accurate and/or robust overlay size estimate by averaging estimates from one or more nodes. For clarity, the method 700 is described below with reference to the AS apparatus 200 shown in FIG. 2. In one implementation, the processor 202 executes one or more sets of codes to control the AS apparatus 200 to perform the functions described below. It will be assumed that the AS apparatus 200 is located at a node in an overlay network and that the AS apparatus 200 performs the functions below to determine the size of the overlay network.

At block 702, a size estimate is determined at a first node. In one implementation, the size estimate is determined by the method 600. For example, the AS apparatus 200 operates at a first node to perform the method 600 to determine a size estimate of an overlay network.

At block 704, size estimates from other nodes are obtained. For example, the first node comprising the AS apparatus operates to obtain size estimates from other nodes. In one implementation, the size estimates are obtained from fingers, neighbors or other nodes that are in communication with the first node. For example, the processor 202 operates to control the transceiver 208 to obtain the size estimates from the other nodes by querying the other nodes for their respective size estimates.

At block 706, the overlay size is determined based on the obtained size estimates. In one implementation, the first node can further refine its size estimate by taking the average of all the overlay size estimates it learns from its fingers, neighbors or other nodes. Thus, the final size estimate $E=(E0+E1+$ E2+ ... +En)/n; where E1 to En are the size estimates obtained from n other nodes and E0 is the first node's size estimate. In one implementation, the processor 202 operates to average the size estimates to obtain a more accurate averaged size estimate.

Therefore, the method 700 operates to refine the first method 600 by averaging size estimates from one or more nodes to obtain a more accurate averaged size estimate. It should be noted that the method 700 is just one implementation and that the operations of the method 700 may be rearranged or otherwise modified within the scope of the various implementations. Thus, other implementations are possible.

Figure 8:
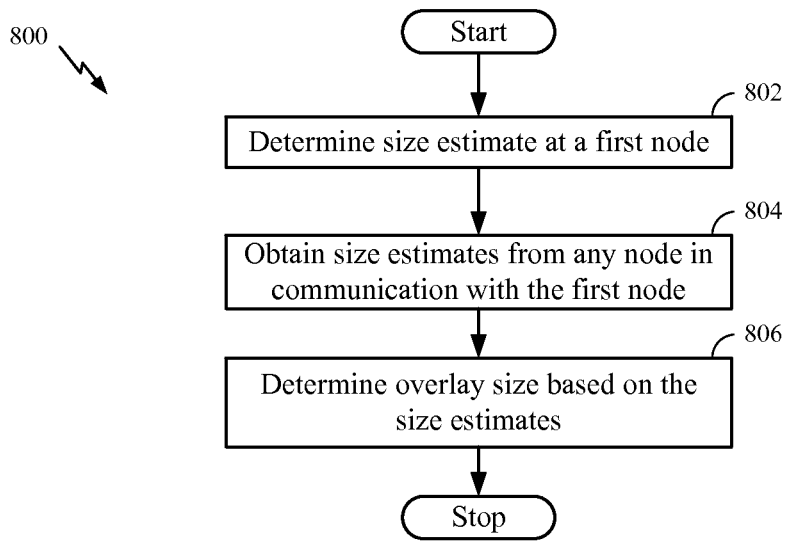
FIG. 8 shows a second refinement method for determining overlay network size in accordance with the AS system.

FIG. 8 shows a second refinement method 800 for determining overlay network size in accordance with the AS system. For example, the method 800 operates to determine a more accurate and/or robust overlay size estimate by averaging estimates from any node in the overlay network. For clarity, the method 800 is described below with reference to the AS apparatus 200 shown in FIG. 2. In one implementation, the processor 202 executes one or more sets of codes to control the AS apparatus 200 to perform the functions described below. It will be assumed that the AS apparatus 200 is located at a first node in an overlay network and that the AS apparatus 200 performs the functions below to determine the size of the overlay network.

At block 802, a size estimate is determined at a first node. In one implementation, the size estimate is determined by the method 600. For example, the AS apparatus 200 operates at the first node to perform the method 600 to determine a size estimate of an overlay network.

At block 804, size estimates from other nodes are obtained. For example, using the above method 700, it is possible that the sampling of size estimation from other nodes is not uniform in the ID space. To combat this, size estimation information is piggybacked on any packet exchange with any node. This provides a more robust view of the size estimates of the network because the number of nodes from which individual size estimates are obtained is increased. Rather than obtaining these estimates from only the neighbors of a node, this refinement makes it possible to get this information from any node that routes packets through a particular node or conducts transactions apart from routing with the particular node. Thus, the first node can obtain size estimates from fingers, neighbors, and any other node that interact with the first node. In one implementation, the processor 202 operates to control the transceiver 208 to obtain the size estimates that are piggybacked on any packet exchange with the first node.

At block 806, the overlay size is determined based on the obtained size estimates. In one implementation, the first node can further refine its size estimate by taking the average of all the overlay size estimates it learns from its fingers, neighbors, or any other node that is in communication with the first node. Thus, the final size estimate E=(E0+E1+E2+ ... +En)/n; where E1 to En are the size estimates obtained from n other nodes and E0 is the first node's size estimate. In one implementation, the processor 202 operates to average the size estimates to obtain a more accurate size estimate.

Therefore, the method 800 operates to refine the first method 600 by providing for size estimates obtained piggybacked on any packet transmission to provide a more robust average. It should be noted that the method 800 is just one implementation and that the operations of the method 800 may be rearranged or otherwise modified within the scope of the various implementations. Thus, other implementations are possible.

Figure 9:
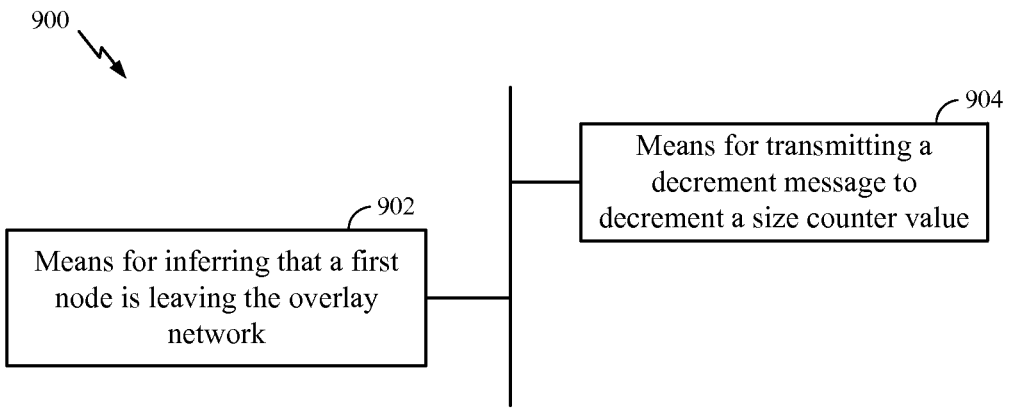
FIG. 9 shows an exemplary AS apparatus constructed in accordance with the AS system.

FIG. 9 shows an exemplary AS apparatus 900 constructed in accordance with the AS system. For example, the AS apparatus 900 is suitable for use as the AS apparatus 200 shown in FIG. 2. In an aspect, the AS apparatus 900 is implemented by at least one integrated circuit comprising one or more modules configured to provide aspects of an AS system as described herein. For example, in one implementation, each module comprises hardware and/or hardware executing software.

The AS apparatus 900 comprises a first module comprising means (902) for inferring that a first node is leaving the overlay network, which in an aspect comprises the processor 202. The AS apparatus 900 also comprises a second module comprising means (904) for transmitting a decrement message to decrement a size counter value, which in an aspect comprises the transceiver 208.

Figure 10:
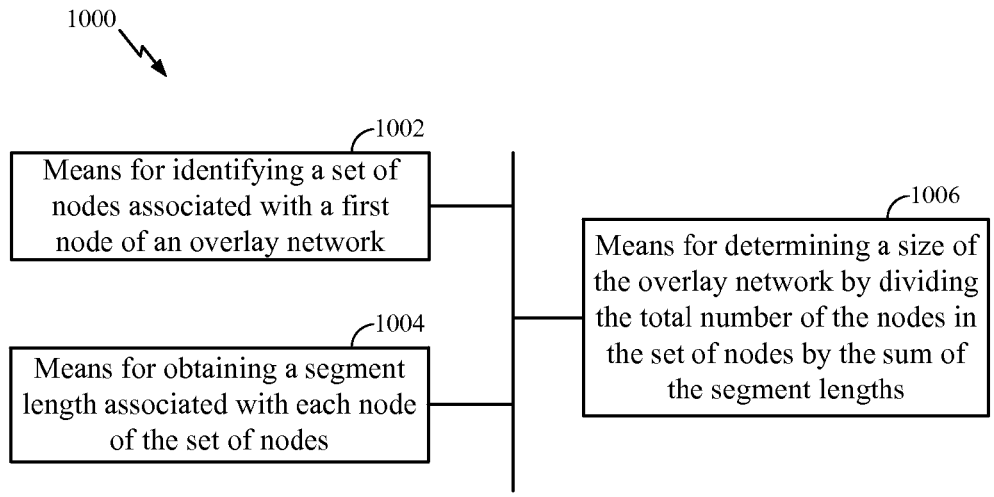
FIG. 10 shows an exemplary AS apparatus constructed in accordance with the AS system.

FIG. 10 shows an exemplary AS apparatus 1000 constructed in accordance with the AS system. For example, the AS apparatus 1000 is suitable for use as the AS apparatus 200 shown in FIG. 2. In an aspect, the AS apparatus 1000 is implemented by at least one integrated circuit comprising one or more modules configured to provide aspects of an AS system as described herein. For example, in one implementation, each module comprises hardware and/or hardware executing software.

The AS apparatus 1000 comprises a first module comprising means (1002) for identifying a set of nodes associated with a first node of an overlay network, which in an aspect comprises the processor 202. The AS apparatus 1000 also comprises a second module comprising means (1004) for obtaining a segment length associated with each node of the set of nodes, which in an aspect comprises the transceiver 208. The AS apparatus 1000 also comprises a third module comprising means (1006) for determining a size of the overlay network by dividing the total number of the nodes in the set of nodes by the sum of the segment lengths, which in an aspect comprises the processor 202.

Figure 11:
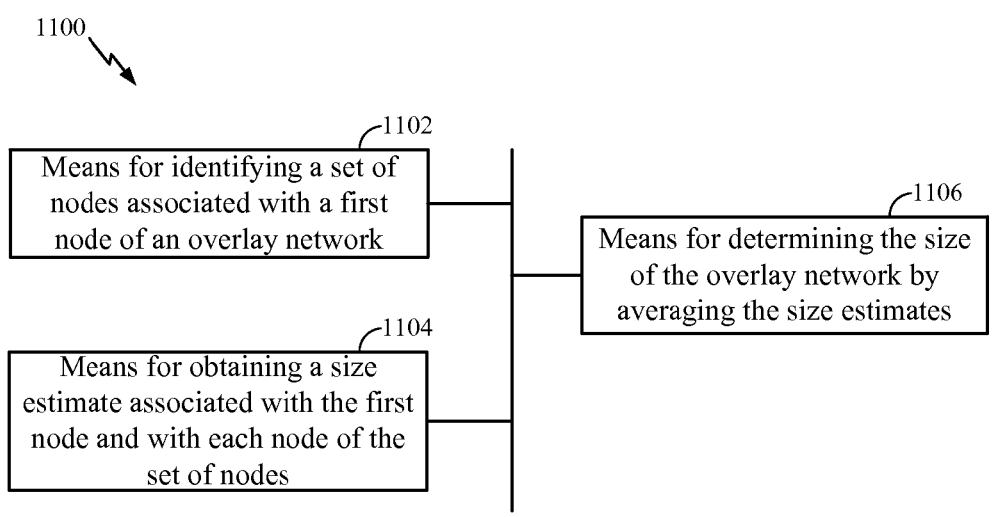
FIG. 11 shows an exemplary AS apparatus constructed in accordance with the AS system.

FIG. 11 shows an exemplary AS apparatus 1100 constructed in accordance with the AS system. For example, the AS apparatus 1100 is suitable for use as the AS apparatus 200 shown in FIG. 2. In an aspect, the AS apparatus 1100 is implemented by at least one integrated circuit comprising one or more modules configured to provide aspects of an AS system as described herein. For example, in one implementation, each module comprises hardware and/or hardware executing software.

The AS apparatus 1100 comprises a first module comprising means (1102) for identifying a set of nodes associated with a first node of an overlay network, which in an aspect comprises the processor 202. The AS apparatus 1100 also comprises a second module comprising means (1104) for obtaining a size estimate associated with the first node and with each node of the set of nodes, which in an aspect comprises the transceiver 208. The AS apparatus 1100 also comprises a third module comprising means (1106) for determining the size of the overlay network by averaging the size estimates, which in an aspect comprises the processor 202.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an adaptive scheduling system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for determining a size of a peer-to-peer overlay network, the method comprising:
   inferring, by a processor, that a first node is leaving the overlay network; and
   transmitting a decrement message to be stored at a data key associated with a size counter to decrement a size counter value, wherein the data key is obtained by hashing at least one string to represent a variable of the size counter maintained in a hash table of the peer-to-peer overlay network.

2. The method of claim 1, wherein said inferring comprises determining that communication with the first node has failed.

3. The method of claim 1, wherein said inferring comprises receiving an indication from a third party that the first node is leaving the overlay network.

4. The method of claim 1, further comprising:
   determining that a second node is joining the overlay network; and
   transmitting an increment message to increment the size counter value.

5. The method of claim 1, further comprising:
   determining that a third node is leaving the overlay network; and
   transmitting the decrement message to decrement the size counter value.

6. The method of claim 1, further comprising querying the size counter value to determine the size of the overlay network.

7. The method of claim 6, wherein the at least one string comprises a known string, and wherein said querying the size counter value comprises hashing the known string to retrieve the size counter value.

8. The method of claim 1, wherein transmitting the decrement message further comprises sending to a node storing the size counter in the peer-to-peer overlay network based on a relationship between an identifier of the node and the data key of the size counter, the relationship being defined by the hash table of the peer-to-peer overlay network.

9. The method of claim 1, wherein transmitting the decrement message further comprises transmitting by a LEAVE ANNOUNCER node designated in the peer-to-peer overlay network based on a relationship between a node key of the first node leaving the overlay network and a node key of the LEAVE ANNOUNCER node.

10. An apparatus for determining a size of a peer-to-peer overlay network, the apparatus comprising:
    memory having instructions stored thereon;
    a processor configured to execute the instructions stored on the memory to infer that a first node is leaving the overlay network and to generate a decrement message to be stored at a data key associated with a size counter located in the peer-to-peer overlay network to decrement a size counter value, wherein the data key is obtained by hashing at least one string to represent a variable of the size counter maintained in a hash table of the peer-to-peer overlay network; and
    a transmitter coupled to the processor and configured to transmit the decrement message to decrement the size counter value.

11. The apparatus of claim 10, wherein said processor is configured to infer by determining that communication with the first node has failed.

12. The apparatus of claim 10, wherein said processor is configured to infer by receiving an indication from a third party that the first node is leaving the overlay network.

13. The apparatus of claim 10, wherein:
    said processor is configured to determine that a second node is joining the overlay network; and
    said transmitter is configured to transmit an increment message to increment the size counter value.

14. The apparatus of claim 10, wherein:
    said processor is configured to determine that a third node is leaving the overlay network; and
    said transmitter is configured to transmit the decrement message to decrement the size counter value.

15. The apparatus of claim 10, wherein said processor is configured to query the size counter value to determine the size of the overlay network.

16. The apparatus of claim 15, wherein the at least one string comprises a known string, and wherein said processor is configured to query the size counter value by hashing the known string to retrieve the size counter value.

17. A
    non-transitory computer-readable medium for determining a size of a peer-to-peer overlay network, the computer-readable medium embodying codes executable by a processor to:
    infer that a first node is leaving the overlay network; and
    transmit a decrement message to be stored at a data key associated with a size counter to decrement a size counter value, wherein the data key is obtained by hashing at least one string to represent a variable of the size counter maintained in a hash table of the peer-to-peer overlay network.

18. The computer-readable medium of claim 17, wherein said codes are configured to cause the processor to infer by determining that communication with the first node has failed.

19. The computer-readable medium of claim 17, wherein said codes are configured to cause the processor to infer by receiving an indication from a third party that the first node is leaving the overlay network.

20. The computer-readable medium of claim 17, wherein said codes are configured to cause the processor to:
   determine that a second node is joining the overlay network; and
   transmit an increment message to increment the size counter value.

21. The computer-readable medium of claim 17, wherein said codes are configured to cause the processor to:
   determine that a third node is leaving the overlay network; and
   transmit the decrement message to decrement the size counter value.

22. The computer-readable medium of claim 17, wherein said codes are configured to cause the processor to query the size counter value to determine the size of the overlay network.

23. The computer-readable medium of claim 22, wherein the at least one string comprises a known string, and wherein said codes are configured to cause the processor to query the size counter value by hashing the known string to retrieve the size counter value.

\* \* \* \* \*